United States Patent
Yashiro et al.

(10) Patent No.: US 11,299,161 B2
(45) Date of Patent: Apr. 12, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Katsuya Yashiro, Wako (JP); Toshiyuki Kaji, Wako (JP); Toru Kokaki, Wako (JP); Masanori Takeda, Wako (JP); Hiroshi Oguro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 16/469,686

(22) PCT Filed: Dec. 21, 2016

(86) PCT No.: PCT/JP2016/088118
§ 371 (c)(1),
(2) Date: Jun. 14, 2019

(87) PCT Pub. No.: WO2018/116409
PCT Pub. Date: Jun. 28, 2018

(65) Prior Publication Data
US 2020/0079377 A1 Mar. 12, 2020

(51) Int. Cl.
*B60W 30/18* (2012.01)
*B60W 10/04* (2006.01)
*G05D 1/00* (2006.01)

(52) U.S. Cl.
CPC ...... *B60W 30/18163* (2013.01); *B60W 10/04* (2013.01); *G05D 1/0088* (2013.01);
(Continued)

(58) Field of Classification Search
None
See application file for complete search history.

(56) References Cited

U.S. PATENT DOCUMENTS

2012/0083964 A1* 4/2012 Montemerlo ............. G06T 7/74
701/26
2015/0353088 A1 12/2015 Ishikawa
(Continued)

FOREIGN PATENT DOCUMENTS

| CN | 1655207 | 8/2005 |
|---|---|---|
| CN | 101297335 | 10/2008 |

(Continued)

OTHER PUBLICATIONS

Hall et al., "Capacity of Automated Highway Systems: Merging Efficiency", Proceedings of the American Control Conference, Albuquerque, New Mexico, Jun. 1997, p. 2046-2050 (Year: 1997).*

(Continued)

*Primary Examiner* — Tamara L Weber
(74) *Attorney, Agent, or Firm* — Amin, Turocy & Watson, LLP

(57) ABSTRACT

A vehicle control system includes: an information acquiring unit that acquires an index value relating to easiness of merging which is evaluated on the basis of at least one of vehicle information relating to an operation of another vehicle that has advanced from a merging lane to a main lane before a subject vehicle and external system information acquired near a merging point using the other vehicle in a case in which the subject vehicle is running in the merging lane merging into the main lane; and an automated driving control unit that executes automated driving of the subject vehicle on the basis of the index value acquired by the information acquiring unit.

10 Claims, 9 Drawing Sheets

(52) U.S. Cl.
CPC ............. *B60W 2720/106* (2013.01); *G05D 2201/0213* (2013.01)

(56) References Cited

U.S. PATENT DOCUMENTS

| | | | | |
|---|---|---|---|---|
| 2016/0375912 | A1* | 12/2016 | Christensen | G06K 9/00335 701/25 |
| 2017/0297622 | A1 | 10/2017 | Niemz | |
| 2021/0155254 | A1* | 5/2021 | Shibata | G05D 1/0061 |

FOREIGN PATENT DOCUMENTS

| | | |
|---|---|---|
| CN | 102934150 | 2/2013 |
| CN | 103065500 | 4/2013 |
| CN | 105723435 | 6/2016 |
| CN | 106097749 | 11/2016 |
| DE | 102014220496 | 4/2016 |
| JP | 2969174 | 11/1999 |
| JP | 2003-302229 | 10/2003 |
| JP | 2004-287672 | 10/2004 |
| JP | 2007-149054 | 6/2007 |
| JP | 2007-168788 | 7/2007 |
| JP | 2007-179388 | 7/2007 |
| JP | 2013-154813 | 8/2013 |
| JP | 2015-230552 | 12/2015 |
| JP | 2015-230573 | 12/2015 |
| JP | 2016-200931 | 12/2016 |

OTHER PUBLICATIONS

Wei et al., "Autonomous Vehicle Social Behavior for Highway Entrance Ramp Management", 2013 IEEE Intelligent Vehicles Symposium (IV), Jun. 23-26, 2013, Gold Coast, Australia, p. 201-207 (Year: 2013).*

International Search Report and Written Opinion for International Application No. PCT/JP2016/088118 dated Mar. 21, 2017, 9 pgs.

Japanese Office Action for Japanese Patent Application No. 2018-557456 dated Feb. 12, 2020.

Chinese Office Action for Chinese Patent Application No. 201680091668.9 dated Oct. 26, 2021.

* cited by examiner

| DATE AND TIME INFORMATION | VEHICLE ID | RUNNING ROUTE | DRIVING MODE | SPEED AFTER MERGING | ACCELERATION IN MERGING LANE | LIGHTING STATE OF DIRECTION INDICATOR | ... |
|---|---|---|---|---|---|---|---|
| 2016/11/28 10:37:00 | V003 | R3 | AUTOMATED | V3 | A3 | L3 | ... |
| 2016/11/28 10:32:20 | V002 | R2 | MANUAL | V2 | A2 | L2 | ... |
| 2016/11/28 10:31:45 | V001 | R1 | AUTOMATED | V1 | A1 | L1 | ... |
| ... | ... | ... | ... | ... | ... | ... | ... |

| DATE AND TIME INFORMATION | VEHICLE ID | GROUND OBJECT INFORMATION | SURROUNDING VEHICLE INFORMATION | ... |
|---|---|---|---|---|
| 2016/11/28 10:37:00 | V003 | OBSTACLE IS PRESENT | TWO | ... |
| 2016/11/28 10:32:20 | V002 | OBSTACLE IS PRESENT | TEN OR MORE | ... |
| 2016/11/28 10:31:45 | V001 | OBSTACLE IS PRESENT | FIVE | ... |
| ... | ... | ... | ... | ... |

| DATE AND TIME INFORMATION | VEHICLE ID | DEGREE OF MERGING EASINESS | ... |
|---|---|---|---|
| 2016/11/28 10:37:00 | V003 | 100% | ... |
| 2016/11/28 10:32:20 | V002 | 10% | ... |
| 2016/11/28 10:31:45 | V001 | 80% | ... |
| ... | ... | ... | ... |

VEHICLE CONTROL SYSTEM, VEHICLE CONTROL METHOD, AND STORAGE MEDIUM

TECHNICAL FIELD

The present invention relates to a vehicle control system, a vehicle control method, and a storage medium.

BACKGROUND ART

In recent years, technologies for executing automated driving of a vehicle by automatically controlling at least one of the acceleration/deceleration and the steering of the vehicle have been researched. In relation to this, a technology has been disclosed (for example, see Patent Document 1) in which, when there is a merging vehicle merging from a merging lane into a main lane, a speed pattern of the merging vehicle and a vehicle which is to be merged with, which becomes a vehicle following the merging vehicle in the main lane, are determined, traffic conditions before and after the vehicle to be merged with are determined, an inter-vehicle distance is adjusted by accelerating/decelerating the speeds of both the vehicle to be merged with and a vehicle running ahead in advance, and the merging vehicle is controlled such that it is able to merge.

CITATION LIST

Patent Literature

[Patent Literature 1] U.S. Pat. No. 2,969,174

SUMMARY OF INVENTION

Technical Problem

However, in the technology of this conventional technique, there are cases in which the situation of a merging point is not perceived in advance, and appropriate driving control relating to merging is not able to be performed.

The present invention is realized in consideration of such situations, and one object thereof is to provide a vehicle control system, a vehicle control method, and a vehicle control program capable of appropriately performing merging of a vehicle through automated driving in accordance with the situation at the time of merging.

Solution to Problem (1) A vehicle control system includes an information acquiring unit that acquires an index value relating to easiness of merging which is evaluated on the basis of at least one of vehicle information relating to an operation of another vehicle that has advanced from a merging lane to a main lane before a subject vehicle and external system information acquired near a merging point using the other vehicle in a case in which the subject vehicle is running in the merging lane merging into the main lane; and an automated driving control unit that executes automated driving of the subject vehicle on the basis of the index value acquired by the information acquiring unit.

(2) The vehicle control system according to (1), wherein the automated driving control unit adjusts a speed of the subject vehicle at the time of merging on the basis of the index value relating to the easiness of merging acquired by the information acquiring unit.

(3) The vehicle control system according to (2), wherein the automated driving control unit performs control of decelerating a speed of the subject vehicle from a target speed at the time of merging or not accelerating the speed from a speed of a current time point.

(4) The vehicle control system according to (1), wherein the vehicle information includes at least one of a speed of another vehicle, which has advanced from the merging lane to the main lane before the subject vehicle, after merging, and an acceleration in the merging lane, and a lighting state of a direction indicator of the other vehicle.

(5) The vehicle control system according to (1), wherein the external system information includes at least one of ground object information acquired near a merging point by another vehicle that has advanced from the merging lane to the main lane before the subject vehicle and information relating to a position of a surrounding vehicle seen from the other vehicle.

(6) The vehicle control system according to (1), further including a merging/no-merging determining unit that determines whether the subject vehicle is able to merge into the main lane on the basis of the index value relating to the easiness of merging acquired by the information acquiring unit, wherein, in a case in which it is determined by the merging/no-merging determining unit that merging is not able to be performed, the automated driving control unit changes at least one of a position at which merging into the main lane starts and an acceleration of the subject vehicle in the merging lane from a reference value and executes automated driving.

(7) The vehicle control system according to (1), wherein, in a case in which it is determined by the merging/no-merging determining unit that merging is not able to be performed, the automated driving control unit executes control of switching the subject vehicle from automated driving to manual driving.

(8) The vehicle control system according to (1), wherein the information acquiring unit acquires at least one of vehicle information relating to an operation of another vehicle that has advanced from the merging lane to the main lane before the subject vehicle and the external system information acquired near the merging point by the other vehicle and generates an index value relating to the easiness of merging into the main lane.

(9) The vehicle control system according to (1), wherein, in a case in which there is no other vehicle that has advanced from the merging lane to the main lane within a predetermined time, the information acquiring unit acquires an index value relating to the easiness of merging evaluated on the basis of at least one of vehicle information relating to an operation of another vehicle having the same date, time frame, or day of merging and the external system information acquired near the merging point using the other vehicle.

(10) A vehicle control method using an in-vehicle computer, the vehicle control method including: acquiring an index value relating to easiness of merging which is evaluated on the basis of at least one of vehicle information relating to an operation of another vehicle that has advanced from a merging lane to a main lane before a subject vehicle and external system information acquired near a merging point using the other vehicle in a case in which the subject vehicle is running in the merging lane merging into the main lane; and executing automated driving of the subject vehicle on the basis of the acquired index value.

(11) A non-transitory computer-readable storage medium that stores a vehicle control program causing an in-vehicle computer to: acquire an index value relating to easiness of merging which is evaluated on the basis of at least one of vehicle information relating to an operation of another vehicle that has advanced from a merging lane to a main lane before a subject vehicle and external system information acquired near a merging point using the other vehicle in a case in which the subject vehicle is running in the merging lane merging into the main lane; and execute automated driving of the subject vehicle on the basis of the acquired index value.

Advantageous Effects of Invention

According to (1), (10), and (11), the subject vehicle can appropriately perform merging through automated driving in accordance with situations at the time of merging.

According to (2), the subject vehicle can execute appropriate merging through automated driving on the basis of an index value relating to the easiness of merging acquired in advance.

According to (3), the subject vehicle can smoothly merge while appropriate controlling the speed.

According to (4) and (5), by using information of other vehicle, which has previously advanced from the merging lane to the main lane, at the time of merging, the subject vehicle can execute appropriate merging according to situations of a current lane.

According to (6) and (7), the subject vehicle can execute appropriate control for performing merging in accordance with situations of a current lane.

According to (8), an index value relating to easiness of merging into the main lane is generated on the basis of information acquired from other vehicle through inter-vehicle communication or the like and can execute appropriate control for performing merging.

According to (9), even in a case in which there is no other vehicle that has merged within a predetermined time, an index value relating to easiness of merging into the main lane can be acquired from other vehicle having close merging conditions.

BRIEF DESCRIPTION OF DRAWINGS

FIG. 5 is a diagram illustrating vehicle information 450A.

FIG. 6 is a diagram illustrating external system information 450B.

FIG. 7 is a diagram illustrating one example of ease of merging information 450C.

DESCRIPTION OF EMBODIMENTS

Hereinafter, a vehicle control system, a vehicle control method, and a vehicle control program according to embodiments of the present invention will be described with reference to the drawings.

[Entire Configuration]

Figure 1:
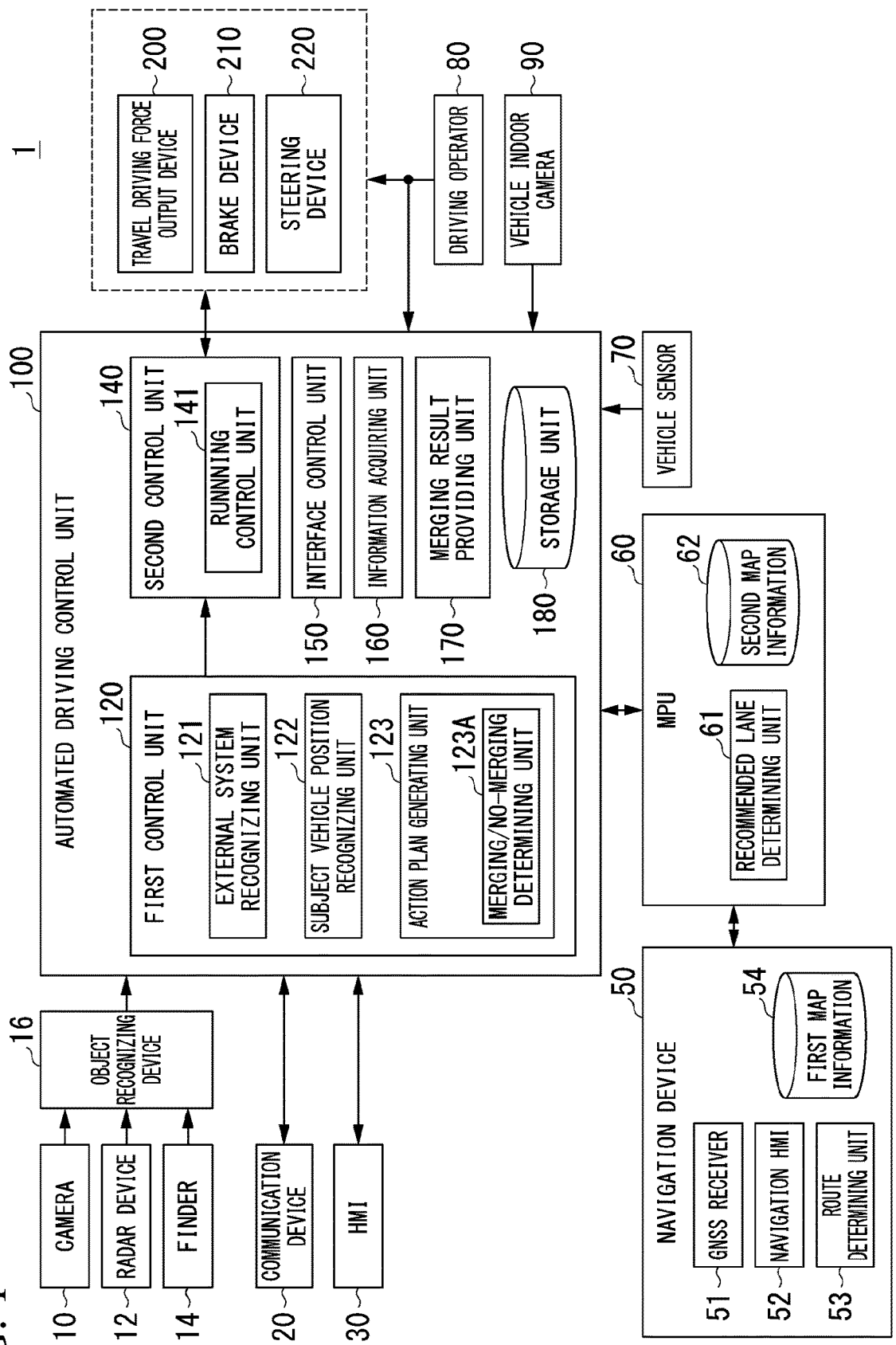
FIG. 1 is a configuration diagram of a vehicle system 1 including an automated driving control unit 100.

FIG. 1 is a configuration diagram of a vehicle system 1 including an automated driving control unit 100. A vehicle in which the vehicle system 1 is mounted (hereinafter, referred to as a "subject vehicle M") is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generating unit connected to an internal combustion engine or discharge power of a secondary cell or a fuel cell.

The vehicle system 1, for example, includes a camera 10, a radar device 12, a finder 14, an object recognizing device 16, a communication device 20, a human machine interface (HMI) 30, a navigation device 50, a micro-processing unit (MPU) 60, a vehicle sensor 70, a driving operator 80, a vehicle indoor camera 90, an automated driving control unit 100, a running driving force output device 200, a brake device 210, and a steering device 220. Such devices and units are interconnected using a multiplex communication line such as a controller area network (CAN) communication line, a serial communication line, a radio communication network, or the like. In addition, the configuration illustrated in FIG. 1 is merely one example, and thus, some components may be omitted, and, furthermore, another component may be added thereto.

The "vehicle control system," for example, includes a camera 10, a radar device 12, a finder 14, an object recognizing device 16, and an automated driving control unit 100.

The camera 10, for example, is a digital camera using a solid-state imaging device such as a charge coupled device (CCD) or a complementary metal oxide semiconductor (CMOS). One or a plurality of cameras 10 are installed at arbitrary places in a vehicle in which the vehicle system 1 is mounted. In a case in which the side in front is to be imaged, the camera 10 is installed at an upper part of a front windshield, a rear face of a rear-view mirror, or the like. In a case in which the side in rear is to be imaged, the camera 10 is installed at an upper part of a rear windshield, a backdoor, or the like. In a case in which the lateral side is to be imaged, the camera 10 is installed at a door mirror or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position (a distance and an azimuth) of an object by detecting radiowaves (reflected waves) reflected by the object. One or a plurality of radar devices 12 are installed at arbitrary places in the subject vehicle M. The radar device 12 may detect a position and a speed of an object using a frequency modulated continuous wave (FMCW) system.

The finder 14 is a light detection and ranging or a laser imaging detection and ranging (LIDAR) finder that detects a distance to a target by measuring light scattered from emitted light. One or a plurality of finders 14 are installed at arbitrary places in the subject vehicle M.

The object recognizing device 16 may perform a sensor fusion process on results of detection using some or all of the camera 10, the radar device 12, and the finder 14, thereby recognizing a position, a type, a speed, and the like of an object. The object recognizing device 16 outputs a result of recognition to the automated driving control unit 100.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to a vehicle occupant inside the vehicle and accepts an input operation performed by a vehicle occupant. The HMI 30, for example, includes various display devices, a speaker, a buzzer, a touch panel, a switch, a key, and the like.

The navigation device 50, for example, includes a global navigation satellite system (GNSS) receiver 51, a navigation HMI 52, and a route determining unit 53 and stores first map information 54 in a storage device such as a hard disk drive (HDD) or a flash memory. The GNSS receiver identifies a position of the subject vehicle M on the basis of signals received from GNSS satellites. The position of the subject vehicle M may be identified or complemented by an inertial navigation system (INS) using an output of the vehicle sensor 70. The navigation HMI 52 includes a display device, a speaker, a touch panel, a key, and the like. A part or the whole of the navigation HMI 52 and the HMI 30 described above may be configured to be shared. The route determining unit 53, for example, determines a route from a position of the subject vehicle M identified by the GNSS receiver 51 (or an input arbitrary position) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The route determined by the route determining unit 53 is output to the MPU 60. In addition, the navigation device 50 may perform route guidance using the navigation HMI 52 on the basis of the route determined by the route determining unit 53. Furthermore, the navigation device 50, for example, may be realized by a function of a terminal device such as a smartphone or a tablet terminal carried by a user. In addition, the navigation device 50 may transmit a current position and a destination to a navigation server through the communication device 20 and acquire a route received from the navigation server as a reply.

The MPU 60, for example, functions as a recommended lane determining unit 61 and maintains second map information 62 in a storage device such as an HDD or a flash memory. The recommended lane determining unit 61 divides a route provided from the navigation device 50 into a plurality of blocks (for example, divides the route into blocks of 100 m in the advancement direction of the vehicle) and determines a recommended lane for each block by referring to the second map information 62. The recommended lane determining unit 61 determines which lane to run from the left side. In a case in which a branching place, a merging place, or the like is present in the route, the recommended lane determining unit 61 determines a recommended lane such that the subject vehicle M can run on a reasonable running route for advancement to divergent destinations.

The second map information 62 is map information having an accuracy higher than that of the first map information 54. In addition, the second map information 62, for example, includes information of the center of respective lanes, information on boundaries between lanes, or the like. In addition, in the second map information 62, road information, traffic regulations information, position information of various gates such as tollgates, address information (address and zip code), facilities information, telephone information, and the like may be included. In the road information, information representing a type of road such as an expressway, a toll road, a national highway, or a prefectural road and information such as the number of lanes of a road, an emergency parking area, a width of each lane, a gradient of a road, a position of a road (three-dimensional coordinates including longitude, latitude, and a height), a curvature of the curve of a lane, positions of merging and branching points of lanes, a sign installed on a road, and the like are included. The second map information 62 may be updated as is necessary by accessing another device using the communication device 20.

The vehicle sensor 70 includes a vehicle speed sensor detecting a speed of the subject vehicle M, an acceleration sensor detecting an acceleration, a yaw rate sensor detecting an angular velocity around a vertical axis, an azimuth sensor detecting the azimuth of the subject vehicle M, and the like.

The driving operator 80, for example, includes an acceleration pedal, a brake pedal, a shift lever, a steering wheel, and other operators. A sensor detecting the amount of an operation or the presence/absence of an operation is installed in the driving operator 80, and a result of detection acquired by the sensor described above is output to one or both of the automated driving control unit 100 and the running driving force output device 200, the brake device 210, or the steering device 220.

The vehicle indoor camera 90 images an upper body half by focusing on the face of a vehicle occupant sitting on a seat (for example, a driver seat) of the subject vehicle M. An image captured by the vehicle indoor camera 90 is output to the automated driving control unit 100.

[Automated Driving Control Unit]

The automated driving control unit 100, for example, includes a first control unit 120, a second control unit 140, an interface control unit 150, an information acquiring unit 160, a merging result providing unit 170, and a storage unit 180. Each of the first control unit 120, the second control unit 140, the interface control unit 150, the information acquiring unit 160, and the merging result providing unit 170 is realized by a processor such as a central processing unit (CPU) executing a program (software). In addition, some or all of the functional units of the first control unit 120, the second control unit 140, the interface control unit 150, the information acquiring unit 160, and the merging result providing unit 170 may be realized by hardware such as a large scale integration (LSI), an application specific integrated circuit (ASIC), a field-programmable gate array (FPGA), or the like or may be realized by cooperation between software and hardware.

In addition, a unit including some or all of an external system recognizing unit 121, a subject vehicle position recognizing unit 122, and an action plan generating unit 123 of the first control unit 120 and a running control unit 141 of the second control unit 140 to be described later is one example of an "automated driving control unit." The automated driving control unit, for example, executes automated driving of the subject vehicle M by automatically controlling at least one of acceleration/deceleration and steering of the subject vehicle M. In addition, a merging/no-merging determining unit 123A to be described later is one example of an "evaluation unit."

The first control unit 120, for example, includes the external system recognizing unit 121, the subject vehicle position recognizing unit 122, and the action plan generating unit 123.

The external system recognizing unit 121 recognizes states of surrounding vehicles such as positions, speeds, and accelerations on the basis of information input from the camera 10, the radar device 12, and the finder 14 through the object recognizing device 16. The position of a surrounding vehicle may be represented as a representative point of the surrounding vehicle such as the center of gravity, a corner, or the like and may be represented by an area represented by the contour of the surrounding vehicle. The "state" of a surrounding vehicle may include an acceleration or a jerk or may be an "action state" (for example, the vehicle is changing lanes or is to change lanes) of the surrounding vehicle.

In addition, the external system recognizing unit 121 may recognize installed objects such as a guard rail, an electric post, and a pole, a temporary obstacle partitioning a road such as cone (pylon), parked vehicles, pedestrians, and other objects and positions of construction sites on a road in addition to surrounding vehicles.

The subject vehicle position recognizing unit 122, for example, recognizes a lane (running lane) in which the subject vehicle M runs and a relative position and a posture of the subject vehicle M with respect to the running lane. The subject vehicle position recognizing unit 122, for example, by comparing a pattern (for example, an array of solid lines and broken lines) of a road partition line that is acquired from the second map information 62 with a pattern of the road partition line in the vicinity of the subject vehicle M that is recognized from an image captured by the camera 10, recognizes a running lane. In the recognition, the position of the subject vehicle M acquired from the navigation device 50 and a processing result acquired using the INS may be additionally taken into account.

In addition, the subject vehicle position recognizing unit 122, for example, recognizes that a running lane of the subject vehicle M is a merging lane on the basis of the position of a merging point acquired from the second map information 62.

Figure 2:
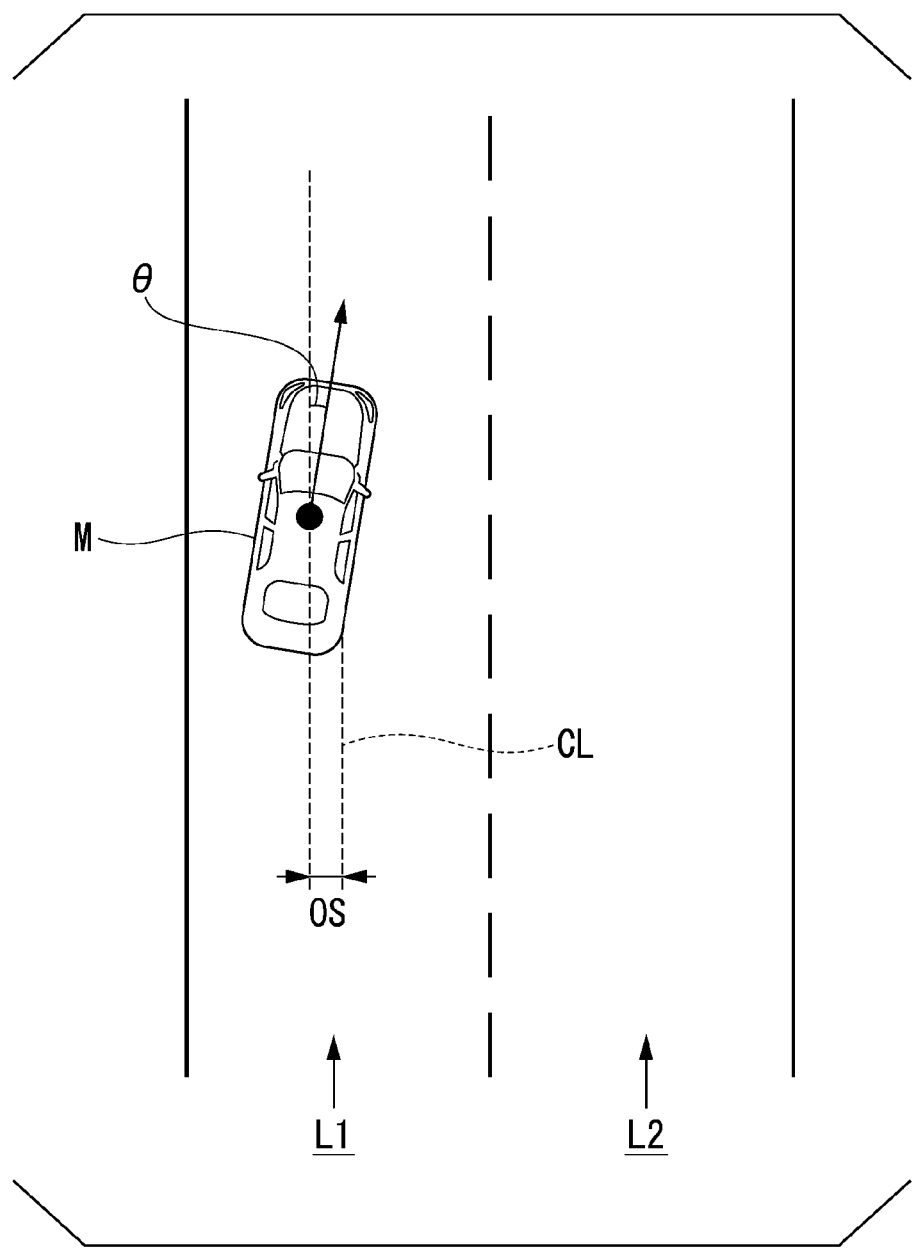
FIG. 2 is a diagram illustrating a view in which a relative position and a relative posture of a subject vehicle M with respect to a running lane L1 are recognized by a subject vehicle position recognizing unit 122.

Then, the subject vehicle position recognizing unit 122, for example, recognizes a position and a posture of the subject vehicle M with respect to the running lane. FIG. 2 is a diagram illustrating a view in which a relative position and a posture of a subject vehicle M with respect to a running lane L1 are recognized by the subject vehicle position recognizing unit 122. The subject vehicle position recognizing unit 122, for example, recognizes an offset OS of a reference point (for example, center of gravity) of the subject vehicle M from running lane center CL and an angle θ of an advancement direction of the subject vehicle M formed with respect to a line acquired by aligning the running lane center CL as a relative position and a posture of the subject vehicle M with respect to the running lane L1. In addition, instead of this, the subject vehicle position recognizing unit 122 may recognize a position of the reference point of the subject vehicle M with respect to any one side end of the running lane L1 or the like as a relative position of the subject vehicle M with respect to the running lane. The relative position of the subject vehicle M recognized by the subject vehicle position recognizing unit 122 is provided for the recommended lane determining unit 61 and the action plan generating unit 123.

The action plan generating unit 123 generates an action plan for the subject vehicle M to perform automated driving for a destination or the like. For example, the action plan generating unit 123 determines events to be sequentially executed in automated driving such that the subject vehicle M runs in a recommended lane determined by the recommended lane determining unit 61 and deals with to a surrounding status of the subject vehicle M. As the events, for example, there are a constant-speed running event in which the subject vehicle runs at a constant speed in the same running lane, a following running event in which the subject vehicle follows a vehicle running ahead, a lane changing event, a merging event, a branching event, an emergency stop event, a switching event for ending automated driving and switching to manual driving, and the like. In addition, at the time of starting such an event or during the execution of such an event, there are cases in which an action for avoidance is planned on the basis of surrounding statuses of the subject vehicle M (the presence/absence of surrounding vehicles and pedestrians, lane contraction according to road construction, and the like).

The action plan generating unit 123 generates a target locus in which the subject vehicle M will run in the future. A target locus is represented by sequentially aligning points (locus points) that the subject vehicle M is to reach. A locus point is a point that the subject vehicle M is to reach for every predetermined running distance, and additionally, a target speed and a target acceleration for every predetermined sampling time (for example, a fraction of a [sec]) are generated as a part of the target locus. In addition, a locus point may be a position that the subject vehicle M is to reach at a sampling time for every predetermined sampling time. In such a case, information of a target speed and a target acceleration are represented at the interval of locus points.

Figure 3:
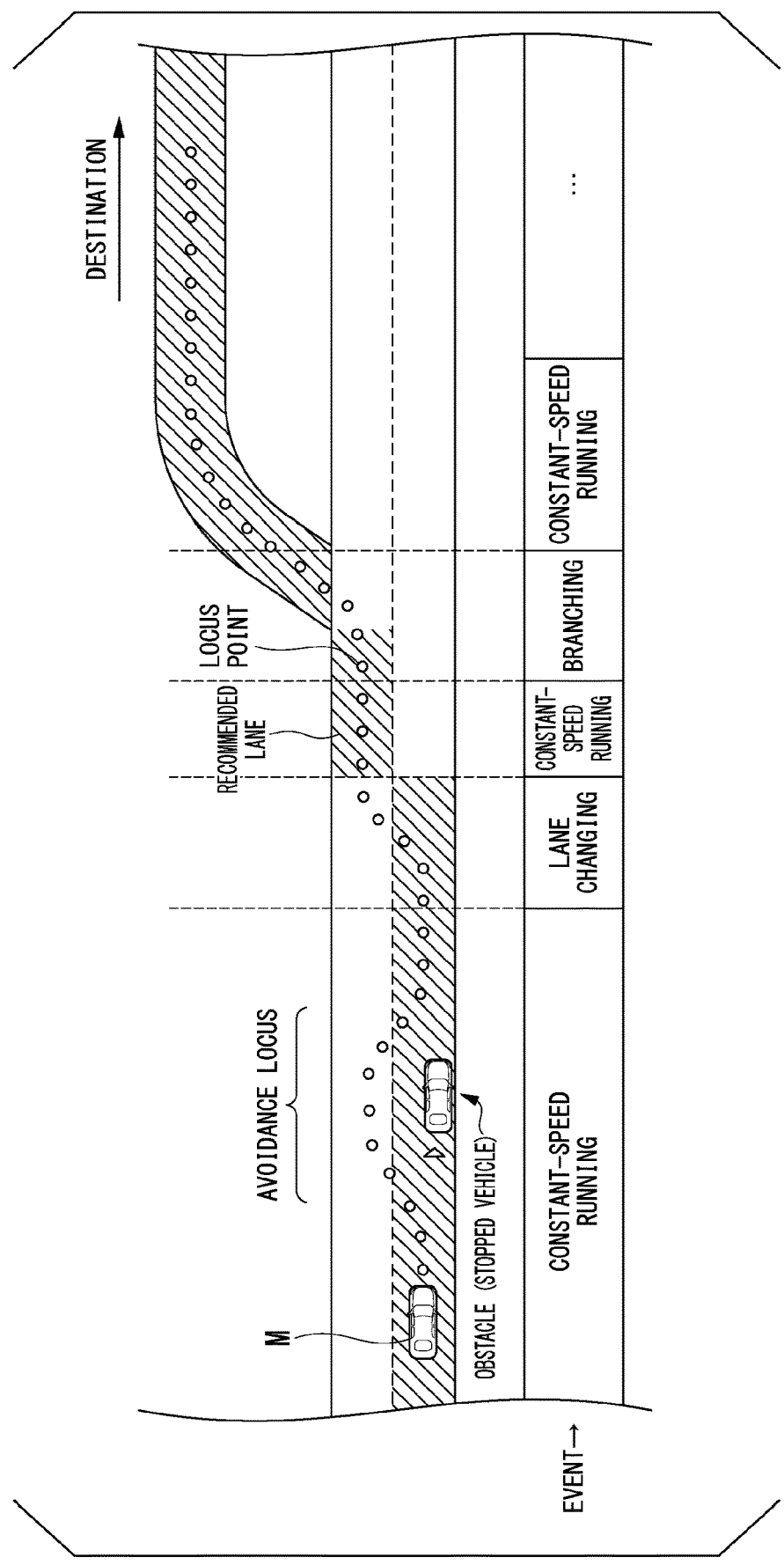
FIG. 3 is a diagram illustrating a view in which a target locus is generated on the basis of a recommended lane.

FIG. 3 is a diagram illustrating a view in which a target locus is generated on the basis of a recommended lane. As illustrated in the drawing, the recommended lane is set such that it is convenient for the subject vehicle to run along a route to a destination. When the subject vehicle reaches a point before a predetermined distance from a recommended lane switching place (may be determined in accordance with a type of event), the action plan generating unit 123 starts the lane changing event, the branching event, the merging event, or the like. In a case in which there is a need for avoiding an obstacle during the execution of each event, as illustrated in the drawing, an avoidance locus is generated.

The action plan generating unit or 123, for example, generates a plurality of candidates of a target locus and selects a target locus that is optimal for a route to a destination at that time point on the basis of the viewpoints of safety and efficiency.

In addition, the action plan generating unit 123, for example, includes a merging/no-merging determining unit 123A. Details of the function of the merging/no-merging determining unit 123A will be described later.

The second control unit 140, for example, includes a running control unit 141. The running control unit 141 controls the running driving force output device 200, the brake device 210, and the steering device 220 such that the subject vehicle M passes through a target locus generated by the action plan generating unit 123 at a scheduled time. In addition, the running control unit 141 may perform switching control between automated driving and manual driving of the subject vehicle M on the basis of an operation of a vehicle occupant that is accepted by the HMI 30.

The interface control unit 150 generates information that is output to the HMI 30. In addition, the interface control unit 150 acquired information that has been accepted by the HMI 30.

The information acquiring unit 160 acquires information relating to a state of other vehicle that has advanced to a main lane from a merging lane before the subject vehicle M at the time of merging (ease of merging information) from an external device. Here, a main lane, for example, is an expressway or a toll road. A merging lane, for example, is a lane for performing acceleration such that the subject vehicle M can run at a target speed of the main lane at a time point at which the subject vehicle M enters the main lane or performs lane change to the main lane at a predetermined timing. The merging lane, for example, is a lane along which a vehicle runs at a speed equal to or lower than a running speed in the main lane. The target speed, for example, is a running speed set using a legal speed limit for the main lane or another criterion.

The ease of merging information, for example, includes an index value relating to easiness of merging that is evaluated on the basis of vehicle information relating to an operation of other vehicle that has advanced from the merging lane from the merging lane to the main lane before the subject vehicle M. An external device, for example, is a merging support device that is installed near a merging point and can communicate with the subject vehicle M. In addition, the external device may be another vehicle that can perform inter-vehicle communication with the subject vehicle M.

The merging result providing unit 170 provides information relating to a merging result after merging from a merging lane to the main lane for the merging support device, other vehicle, or the like using the communication device 20. In the information relating to a merging result, for example, vehicle information relating to an operation of the subject vehicle M and external system information at the time of running relating to merging is included.

In the vehicle information, for example, at least one of a vehicle speed, an acceleration in the merging lane, and a lighting state of a direction indicator of the other vehicle at the time of the other vehicle being successful in merging is included. In addition, in the vehicle information, information of a running route and a driving mode of the subject vehicle M may be included. Here, the external system information, for example, is information of an external system that is recognized by the object recognizing device 16 using information from the camera 10, the radar device 12, or the finder 14. In the external system information, for example, at least one of ground object information acquired by the other vehicle near a merging point and information relating to a position of a surrounding vehicle seen from the other vehicle is included. Details of the vehicle information and the external system information will be described later.

The storage unit 180 is a storage device such as a hard disk drive (HDD), a flash memory, a random access memory (RAM), a read only memory (ROM), or the like. In the storage unit 180, for example, ease of merging information acquired by the information acquiring unit 160 is stored. In addition, information relating to a merging result of the subject vehicle M may be stored in the storage unit 180, and address information used for communicating with the merging support device or the other vehicle may be stored in the storage unit 180.

The running driving force output device 200 outputs a running driving force (torque) for allowing a vehicle to run to driving wheels. The running driving force output device 200, for example, includes a combination of an internal combustion engine, an electric motor, a transmission gear, and the like and an electronic control unit (ECU) controlling such components. The ECU controls the components described above on the basis of information input from the running control unit 141 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the running control unit 141 or the information input from the driving operator 80 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. In addition, the brake device 210 is not limited to the configuration described above and may be an electronic control-type hydraulic brake device that delivers a hydraulic pressure of the master cylinder to the cylinder by controlling an actuator on the basis of information input from the running control unit 141. In addition, the brake device 210 may include brake devices of a plurality of systems in consideration of the aspect of safety.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the running control unit 141 or information input from the driving operator 80.

[Automated Driving Control of Subject Vehicle M at the Time of Merging]

Hereinafter, automated driving control of the subject vehicle M at the time of merging will be described. For example, in the case of running along a merging lane merging into a main lane, the subject vehicle M according to an embodiment acquires ease of merging information for another vehicle that has advanced from the merging lane to the main lane before the subject vehicle M from the merging support device and executes driving control relating to merging of the subject vehicle M on the basis of the acquired information.

Figure 4:
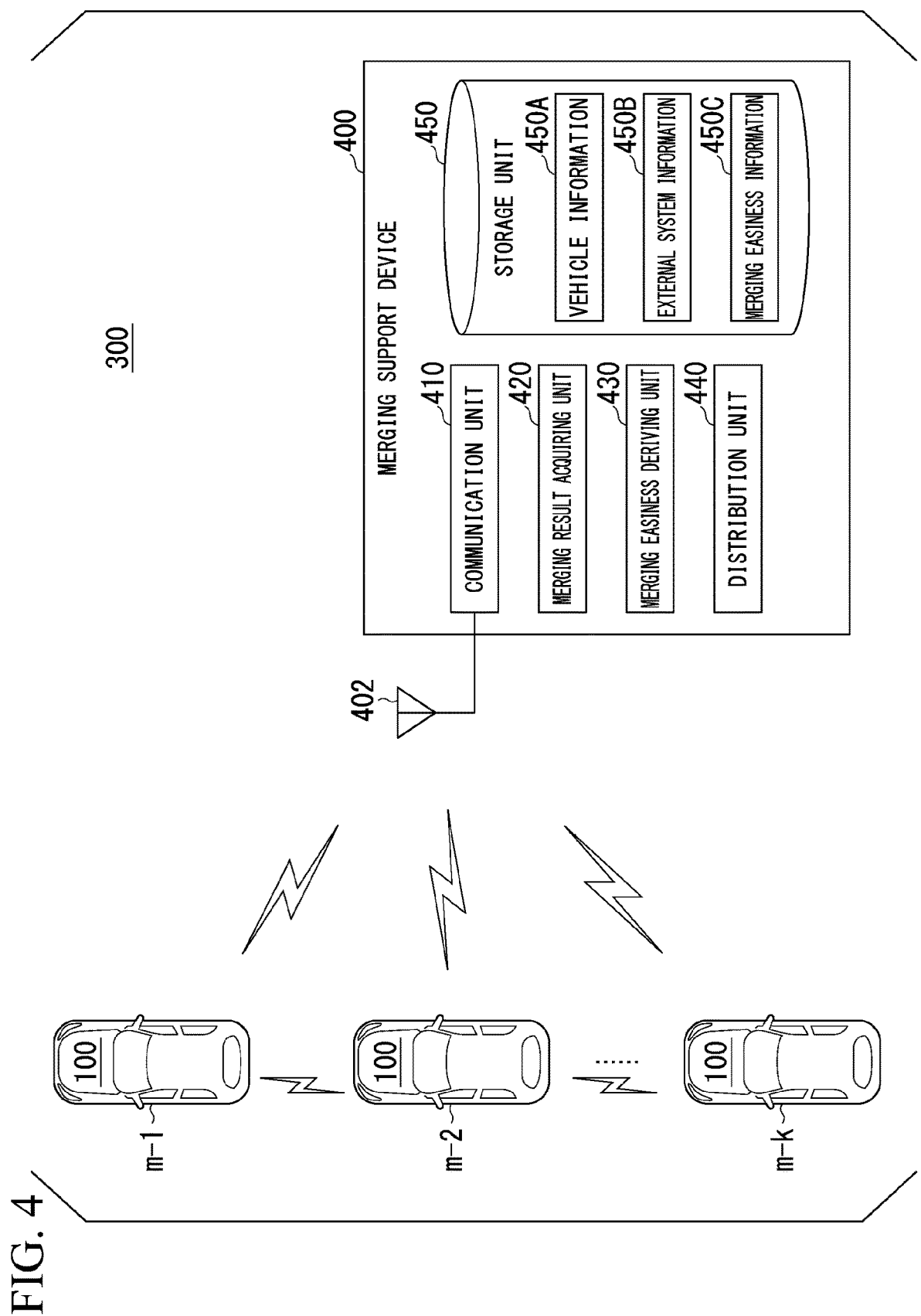
FIG. 4 is a diagram illustrating one example of the configuration of a traffic information sharing system 300.

Here, a traffic information sharing system including the automated driving control unit 100 according to an embodiment and a merging support device will be described. FIG. 4 is a diagram illustrating one example of the configuration of a traffic information sharing system 300. The traffic information sharing system 300 includes a plurality of vehicles m–1 to m-k (here, k is an arbitrary natural number) in which automated driving control units 100 are mounted and a merging support device 400.

In each of the vehicles m–1 to m-k, components similar to those of the subject vehicle M described above are mounted. Hereinafter, in a case in which the vehicles m–1 to m-k are not to be differentiated from each other, one thereof will be simply referred to as a vehicle m. The subject vehicle M is included as the vehicle m. In addition, in the vehicle m, a vehicle ma running ahead to be described later may be included.

The vehicle m and the merging support device 400, for example, communicate with each other using a communication system such as dedicated short range communications (DSRC) or the like through an antenna 402 included in the merging support device 400. The vehicle m and the merging support device 400 may wirelessly communicate with each other using a mobile phone network, a Wi-Fi network, or the like. In addition, a plurality of vehicles m may directly perform inter-vehicle communication.

The merging support device 400, for example, includes a communication unit 410, a merging result acquiring unit 420, a merging easiness deriving unit 430, a distribution unit 440, and a storage unit 450. Each of the merging result acquiring unit 420, the merging easiness deriving unit 430, and the distribution unit 440 is realized by a processor such as a CPU or the like executing a program. In addition, some or all of the functional units of the merging result acquiring unit 420, the merging easiness deriving unit 430, and the distribution unit 440 may be realized by hardware such as an LSI, an ASIC, an FPGA, or the like or may be realized by cooperation between software and hardware. The storage unit 450 is a storage device such as an HDD, a flash memory, a RAM, a ROM, or the like. In the storage unit 450, for example, information of the vehicle information 450A and the external system information 450B is stored.

The communication unit 410 receives information relating to the vehicle information 450A and the external system information 450B to be described later which has been transmitted by a vehicle m after merging into the main lane. In addition, the communication unit 410 transmits information stored by the merging support device 400 to the vehicle m.

The merging result acquiring unit 420, for example, acquires the vehicle information 450A and the external system information 450B received from the vehicle m using the communication unit 410. In addition, the merging result acquiring unit 420 stores the vehicle information 450A and the external system information 450B in the storage unit 450.

FIG. 5 is a diagram illustrating one example of the vehicle information 450A. The vehicle information 450A, for example, is information in which a running route at the time of merging, a driving mode, a speed after merging, an acceleration in the merging lane, and a lighting state of the direction indicator are associated with date and time information and a vehicle ID.

The data and time information, for example, is date and time information at which the vehicle m has sent the vehicle information 450A and the external system information 450B. The vehicle ID is identification information used for identifying a vehicle m. In addition, in the vehicle ID, identification of a vehicle model may be included. The running route, for example, is a route in which the vehicle m has run at the time of merging. The driving mode, for example, is information used for identifying a driving mode at the time of merging. For example, in a case in which automated driving is executed at the time of merging, information indicating the automated driving is stored in the driving mode. In a case in which manual driving, in which an operation using the driving operator 80 is accepted from a vehicle occupant, and the vehicle m is caused to run on the basis of the accepted operation, is executed, information indicating manual driving is stored in the driving mode.

The speed after merging, for example, is a speed immediately after merging from a merging lane into a main lane through automated driving. The acceleration in the merging lane, for example, is information in which a position of the merging lane of the vehicle m and a displacement of an acceleration are associated with each other. In addition, the lighting state of the direction indicator, for example, is information relating to timings of start and end of lighting of the direction indicator at the time of merging.

FIG. 6 is a diagram illustrating one example of the external system information 450B. In the external system information 450B illustrated in FIG. 6, ground object information and surrounding vehicle information are associated with the date and time information and the vehicle ID. The ground object information, for example, is information relating to information of ground objects present in the vicinity when the vehicle m merges into the main lane. The ground object information, for example, is identification information and position information of installed objects such as a guard rail, a pole, and the like. In addition, the ground object information may be information relating to identification information and positions of temporary obstacles such as a fence, cones, a construction site, and the like.

The surrounding vehicle information, for example, is information relating to the number of surrounding vehicles present in a merging lane or a main lane at the time of merging. In addition, the surrounding vehicle information may be a local map representing a relative position and a relative direction of a surrounding vehicle with respect to the position of the vehicle m.

The merging easiness deriving unit 430, for example, derives a degree of ease of merging for each vehicle on the basis of the vehicle information 450A. In such a case, the merging easiness deriving unit 430, for example, acquires a difference between a speed at the time of merging for each vehicle ID and a merging target speed set in advance. In addition, the merging easiness deriving unit 430 may acquire a difference between an acceleration in the merging lane and a set target acceleration in advance. Furthermore, the merging easiness deriving unit 430 may acquire a difference between a lighting time of the direction indicator and a target lighting time set in advance. In addition, the merging easiness deriving unit 430 may acquire a difference between an average speed of a vehicle running in a lane which is the main lane to be merged with and a speed of a target vehicle at the time of merging of which information is acquired by the subject vehicle M. The merging easiness deriving unit 430 derives a degree of ease of merging by evaluating easiness of merging on the basis of at least one of the differences described above.

For example, in a case in which each of the differences described above (or an average value or a sum value of the differences) is equal to or smaller than a threshold, the merging easiness deriving unit 430 may set a degree of ease of merging for being able to perform merging according to running close to a target value to 100%. On the other hand, in a case in which each of the differences exceeds a threshold, the merging easiness deriving unit 430 decreases a degree of ease of merging in accordance with the magnitude of the differences from the threshold. In addition, the merging easiness deriving unit 430 may set a priority level for each type of information that is a source for deriving each of the differences described above and derive a degree of easiness of merging with reference to a set priority level. In such a case, the merging easiness deriving unit 430, for example, adds a weighting factor according to a priority level to each of the differences and derives a degree of ease of merging with reference to the sum value.

In addition, the merging easiness deriving unit 430 may derive a degree of ease of merging for each vehicle on the basis of the external system information 450B. In such a case, for example, in a case in which a section used for changing lanes from a merging lane to the main lane at the time of merging is not narrowed by an obstacle on the basis of the ground object information included in the external system information 450B, the merging easiness deriving unit 430 may derive a degree of ease of merging as 100%.

On the other hand, in a case in which a section used for changing lanes from a merging lane to the main lane at the time of merging is narrowed by an obstacle, the merging easiness deriving unit 430 may derive a degree of ease of merging which decrease in a stepwise manner from 100% in accordance with the length of the narrowed section.

In addition, for example, in a case in which the number of surrounding vehicles of the main lane is equal to or smaller than three on the basis of the surrounding vehicle information included in the external system information 450B, the merging easiness deriving unit 430 may derive a degree of ease of merging as 100%. On the other hand, in a case in which the number of surrounding vehicles exceeds three, the merging easiness deriving unit 430 derives a degree of ease of merging to which decreases in a stepwise manner from 100% in accordance with the number of the surrounding vehicles. In addition, the merging easiness deriving unit 430 may combine degrees of ease of merging acquired from the vehicle information 450A and the external system information 450B described above.

The merging easiness deriving unit 430 stores the generated degree of ease of merging as the ease of merging information 450C in the storage unit 450 in association with the date and time information and the vehicle ID. FIG. 7 is a diagram illustrating one example of the ease of merging information 450C. In a degree of ease of merging illustrated in FIG. 7, for example, an average value of degrees of ease of merging acquired from the vehicle information 450A and the external system information 450B is stored. In addition, in the degree of ease of merging illustrated in FIG. 7, a degree of ease of merging based on each generation condition may be stored, or a maximum value or a minimum value of the degree of ease of merging may be stored.

Furthermore, the merging easiness deriving unit 430 may use an index value such as a degree of merging difficulty, a merging risk, or the like as an index value instead of the degree of ease of merging. In such a case, the merging easiness deriving unit 430 performs setting such that a degree of merging difficulty and a merging risk have higher values as the difference described above increases.

In addition, the merging easiness deriving unit 430 may perform statistical processing on the basis of the vehicle information 450A and the external system information 450B acquired from a plurality of vehicles. In such a case, the merging easiness deriving unit 430, for example, may generate an average degree of ease of merging for each time, for each vehicle model, or for each driving mode from the vehicle information 450A and the external system information 450B.

The distribution unit 440 distributes the ease of merging information 450C to a vehicle m in a case in which the vehicle m running in a merging lane is within a predetermined distance from a merging start point. In addition, the distribution unit 440 may accept an inquiry from a vehicle m and distribute the ease of merging information 450C to the accepted vehicle m. Furthermore, the distribution unit 440 may distribute the external system information 450B together with the ease of merging information 450C.

[Acquisition of Information at the Time of Merging of Vehicle Running Ahead]

Figure 8:
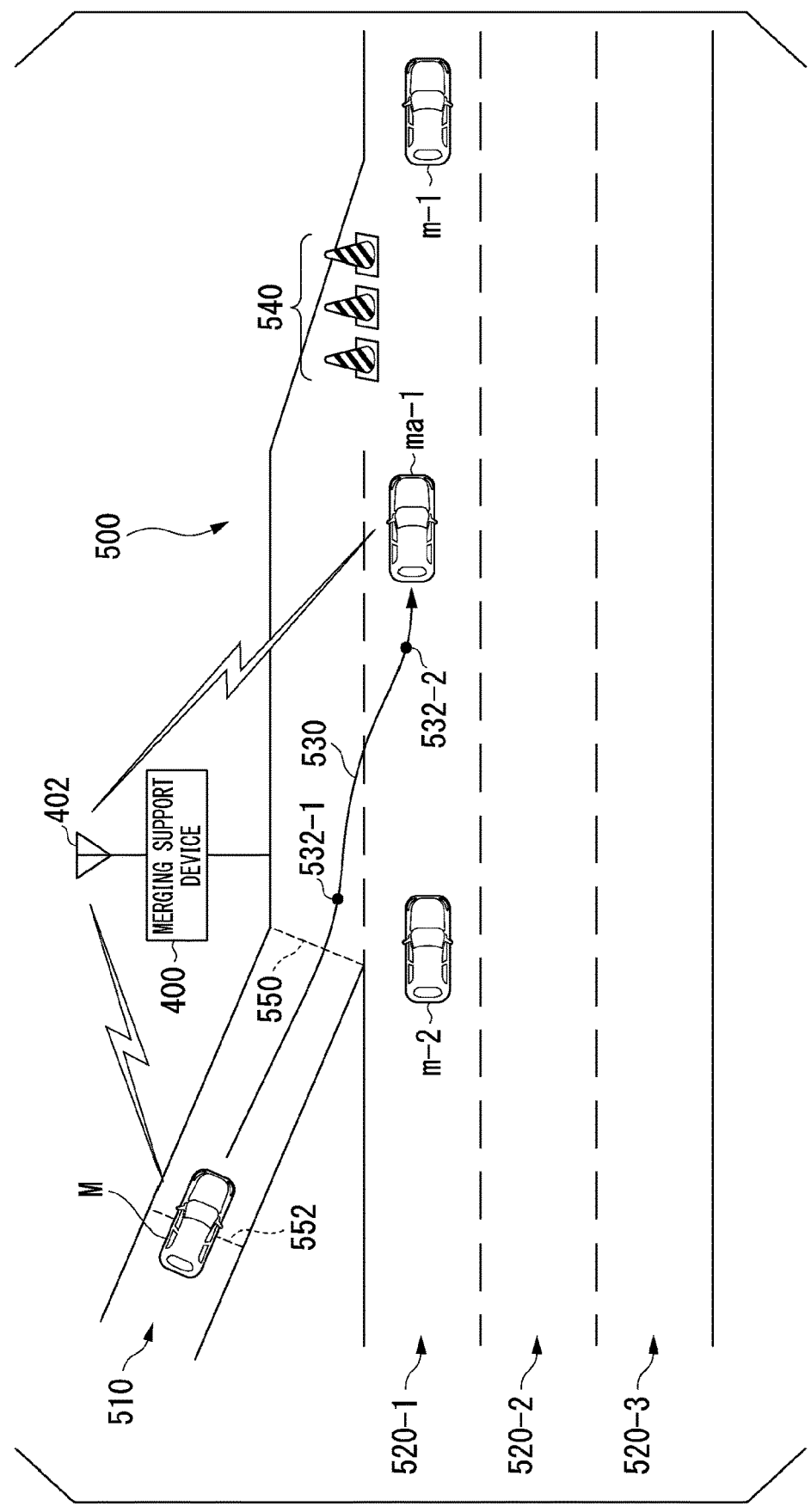
FIG. 8 is a diagram illustrating a view in which information is acquired from a vehicle running ahead.

FIG. 8 is a diagram illustrating a view in which information from a vehicle running ahead is acquired. In the example illustrated in FIG. 8, a view in which a subject vehicle M merges from a merging lane into a main lane is illustrated. In the example illustrated in FIG. 8, the merging lane and main lanes 520-1 to 520-3 are illustrated on a road 500. In the example illustrated in FIG. 8, a vehicle ma-1 running ahead is a vehicle that runs in the merging lane 510 before the subject vehicle M and thereafter merges into the main lane 520-1.

After completion of merging (at the time of running in the main lane), the vehicle ma-1 running ahead transmits information relating to a running route 530 and information relating to a driving mode at the time of running along the running route 530, a speed after merging, an acceleration for the merging lane, a lighting start point 532-1 of the direction indicator, and a lighting end point 532-2 to the merging support device 400 as the vehicle information 450A. In addition, the vehicle ma-1 running ahead transmits information relating to surrounding vehicles m-1 and m-2 and information relating to an obstacle 540 such as a cone or the like to the merging support device 400 as the external system information 450B.

The merging support device 400 generates ease of merging information 450C on the basis of the vehicle information 450A and the external system information 450B acquired from the vehicle ma-1 running ahead. In addition, the merging support device 400 distributes the generated ease of merging information 450C.

The information acquiring unit 160 of the subject vehicle M acquires the ease of merging information 450C distributed from the merging support device 400. For example, in a case in which a gravity center position of the subject vehicle M passes through a point 552 that is disposed at a predetermined distance in front of the merging start point 550, the information acquiring unit 160 inquires of the merging support device 400 about the ease of merging information 450C and acquires the ease of merging information 450C from the merging support device 400. In addition, the information acquiring unit 160 may acquire the ease of merging information 450C distributed from the merging support device 400 without making an inquiry.

In addition, the information acquiring unit 160 may acquire a degree of ease of merging of a vehicle running ahead that has executed merging most recently by referring to the date and time information from the merging support device 400. Here, "most recently," for example, represents a case in which an elapsed time from a time at which a vehicle running ahead has merged is within a predetermined time. In addition, in a case in which there is no vehicle running ahead which has executed merging most recently, the information acquiring unit 160 may acquire a degree of ease of merging of other vehicle having the same date, time frame, or day of merging from the merging support device 400. In this way, a degree of ease of merging can be acquired from another vehicle that has merged with a condition that is close to the merging conditions of the subject vehicle M.

In addition, the information acquiring unit 160 may acquire a degree of ease of merging of a vehicle running ahead in a case in which the driving mode at the time of merging is automated driving from the merging support device 400. In addition, the information acquiring unit 160 may acquire degrees of ease of merging for a plurality of vehicles running ahead from the merging support device 400. In such a case, the information acquiring unit 160, for example, acquires an average of index values of evaluations included in evaluation results.

The merging/no-merging determining unit 123A determines whether or not the subject vehicle M can merge through automated driving on the basis of the degree of ease of merging distributed from the merging support device 400. For example, in a case in which a degree of ease of merging included in the ease of merging information 450C is equal to or higher than 80%, the merging/no-merging determining unit 123A determines that merging through automated driving can be performed and causes the action plan generating unit 123 to execute a merging event.

The example illustrated in FIG. 8 illustrates a status in which the degree of ease of merging is 100%. For this reason, the merging/no-merging determining unit 123A determines that merging can be performed through automated driving and causes the action plan generating unit 123 to execute a merging event. In this case, the action plan generating unit 123 performs control of acceleration and the like such that merging into a main lane can be performed at a target speed at the time of merging set in advance.

Here, the information acquiring unit 160 may acquire the external system information 450B of the vehicle running ahead from the merging support device 400 together with the ease of merging information 450C. In such a case, the action plan generating unit 123 generates an action plan based on a merging event on the basis of the external system information near the merging point which is included in the external system information 450B acquired by the information acquiring unit 160. In this way, the subject vehicle M can execute appropriate merging on the basis of latest external system information acquired by the vehicle running ahead until the merging point is reached.

In addition, in a case in which a degree of ease of merging is equal to or higher than 50% and is lower than 80%, the merging/no-merging determining unit 123A determines that merging at the target speed set in advance is not be able to be performed and causes the action plan generating unit 123 to execute a merging event through automated driving without decelerating the speed of the subject vehicle M from the target speed or accelerating the subject vehicle from a speed of the current time point. In this case, the action plan generating unit 123 adjusts the speed such that the rate of deceleration increases as the degree of ease of merging decreases. In this way, even in a case in which the main lane 520 is congested at the time of merging or a case in which a section in which merging can be performed is narrow due to an obstacle or the like, the subject vehicle M can execute merging through automated driving at an appropriate speed.

In addition, in a case in which the degree of ease of merging is lower than 50%, the merging/no-merging determining unit 123A may determine that merging through automated driving is not be able to be performed and cause the action plan generating unit 123 to execute a switching event for switching from automated driving to manual driving. In this way, the subject vehicle M can determine automated driving or manual driving from a stage before the merging point with time to spare and perform driving control on the basis of a result of the determination.

Figure 9:
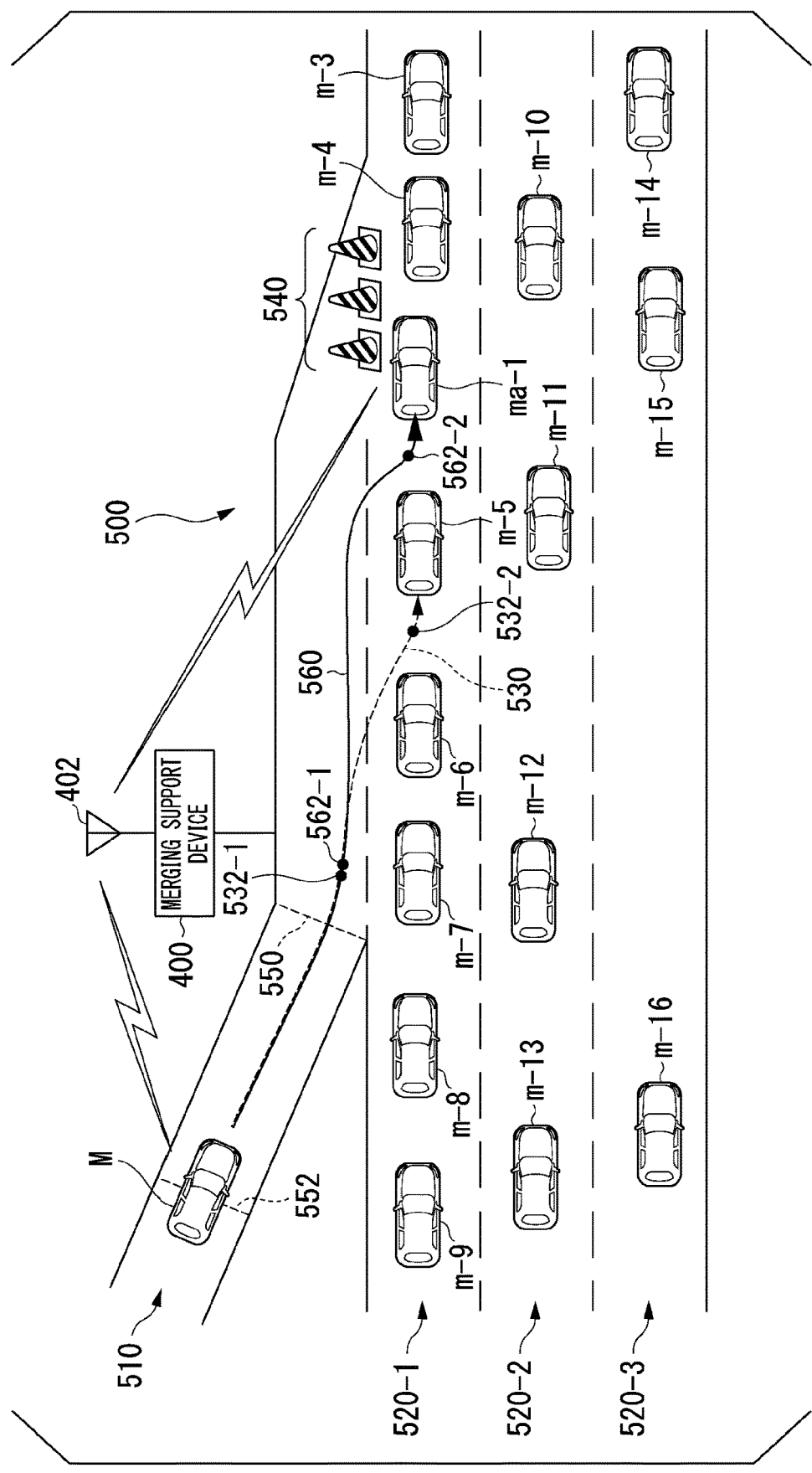
FIG. 9 is a diagram illustrating a view in which information is acquired from a vehicle running ahead.

FIG. 9 is a diagram illustrating a view of a merging point in a case in which the degree of ease of merging is low. In the example illustrated in FIG. 9, vehicles m3 to m16 are other vehicles running in main lanes 520-1 to 520-3.

In a situation illustrated in FIG. 9, a vehicle ma-1 running ahead transmits information relating to a running route 560 and information relating to a driving mode at the time of running in the running route 560, a speed after merging, an acceleration for a merging lane, and a lighting start point 562-1 and a lighting end point 562-2 of the direction indicator to the merging support device 400 as vehicle information 450A after completion of merging (at the time of running in a main lane). In addition, the vehicle ma-1 running ahead transmits information relating to the surrounding vehicles m-3 to m–16 and information relating to obstacles 540 such as a cone and the like to the merging support device 400 as external system information 450B.

The merging support device 400 generates ease of merging information 450C on the basis of the vehicle information 450A and the external system information 450B acquired from the vehicle ma-1 running ahead. Here, a running route 530 illustrated in FIG. 9 is set as a target route (target locus) at the time of merging, and a lighting start point 532-1 and a lighting end point 532-2 of a direction indicator are set as a target lighting start point and a target lighting end point.

Since a difference between running routes and a difference between lighting start points are larger than thresholds, the merging easiness deriving unit 430 evaluates a degree of ease of merging to be low. By acquiring the degree of ease of merging, the subject vehicle M can execute control of switching to manual driving and the like with time to spare before the subject vehicle M passes through the merging start point 550.

In addition, in a case in which it is determined that merging is not be able to be performed, the merging/no-merging determining unit 123A may cause the action plan generating unit 123 to execute a process of stopping the subject vehicle M at an end of the merging lane 510.

In addition, in a case in which it is determined that merging is not be able to be performed, the merging/no-merging determining unit 123A may cause the action plan generating unit 123 to change at least one of a position at which merging into a main lane 520-1 starts and an acceleration of the subject vehicle M during running in a merging lane 510 from the target merging start position and the target acceleration (reference value) set in advance. In such a case, the merging/no-merging determining unit 123A performs determination of merging or no-merging again on the basis of the point at which merging starts and the acceleration during running that have been changed.

The interface control unit 150, for example, presents information relating to a determination result to a vehicle occupant using the HMI 30 at a timing at which the determination result is acquired by the merging/no-merging determining unit 123A. In this way, a vehicle occupant can easily perceive that that subject vehicle M will execute merging through automated driving and switching to manual driving. In addition, the interface control unit 150 may present the ease of merging information 450C acquired from the merging support device 400 and information relating to a merging result provided for the merging support device 400 to a vehicle occupant using the HMI 30.

[Process Flow]

Figure 10:
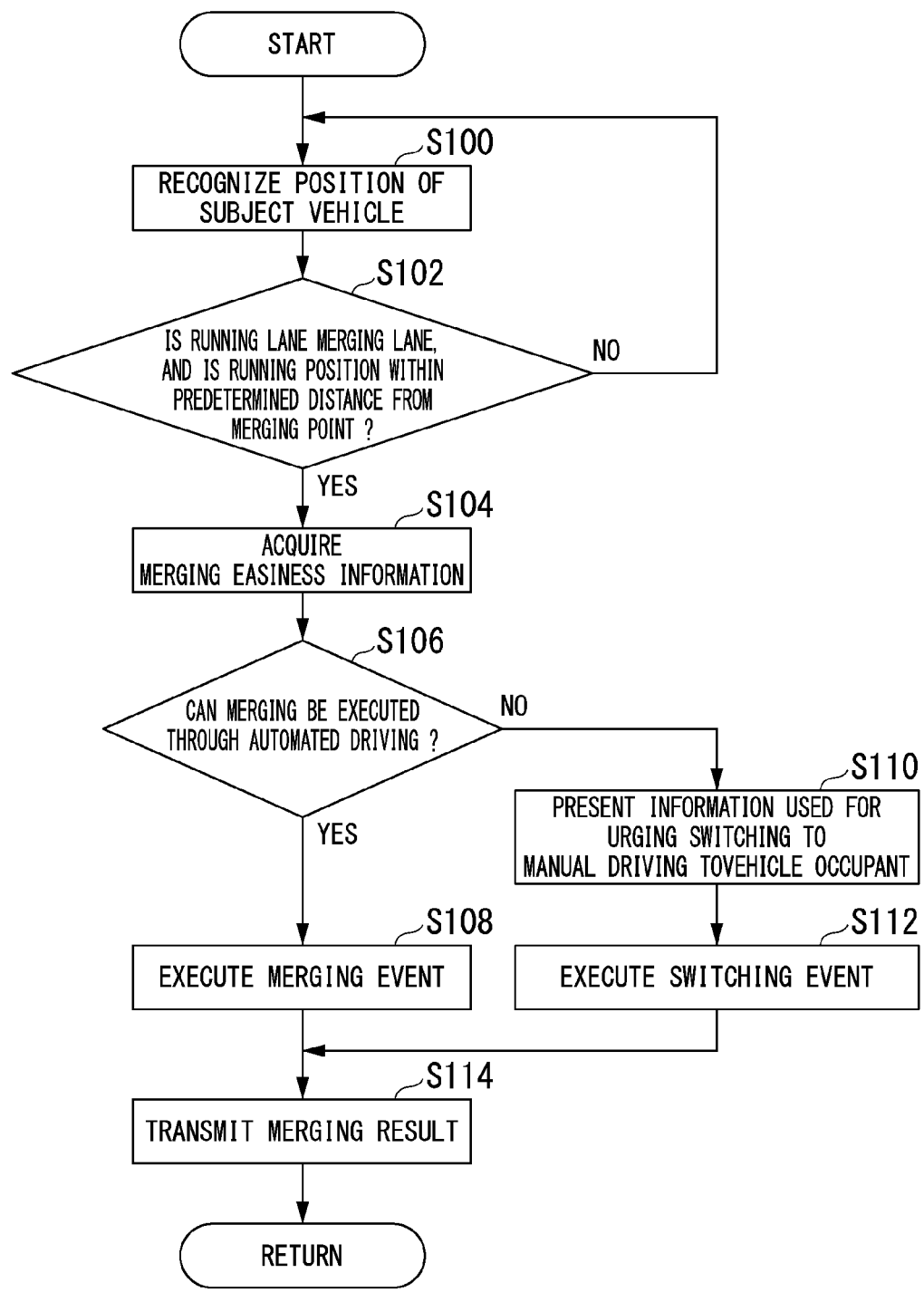
FIG. 10 is a flowchart illustrating one example of automated driving control in merging according to an embodiment.

Hereinafter, one example of various vehicle control using the vehicle system 1 according to an embodiment will be described. FIG. 10 is a flowchart illustrating one example of automated driving control in merging according to an embodiment.

First, the subject vehicle position recognizing unit 122 recognizes the position of the subject vehicle M (Step S100). Next, the subject vehicle position recognizing unit 122 determines whether or not a lane in which the subject vehicle is running is a merging lane, and a running position of the subject vehicle M is within a predetermined distance from a merging point (Step S102). In a case in which a lane in which the subject vehicle is running is a merging lane, and the running position of the subject vehicle M is within a predetermined distance from the merging point, the information acquiring unit 160 acquires ease of merging information 450C from the merging support device 400 (Step S104).

Next, the merging/no-merging determining unit 123A determines whether or not merging through automated driving can be executed on the basis of the acquired ease of merging information 450C (Step S106). In a case in which merging through automated driving can be executed, the action plan generating unit 123 executes an merging event (Step S108).

In a case in which merging through automated driving is not be able to be executed, the interface control unit 150 presents information used for urging switching to manual driving to a vehicle occupant (Step S110). Next, the action plan generating unit 123 accepts a vehicle occupant's operation on the driving operator 80 and the like and executes a switching event (Step S112). Next, the merging result providing unit 170 transmits a result of merging to the merging support device 400 (Step S114), and the process of this flowchart ends.

In the example illustrated in FIG. 10, although only the ease of merging information 450C is acquired from the merging support device 400, the external system information 450B may be acquired together with the ease of merging information 450C. In such a case, the action plan generating unit 123 generates an action plan in a merging event or a switching event on the basis of the external system information 450B. For example, the action plan generating unit 123 may determine a degree of congestion of a main lane, presence/absence of a vehicle group, and the like on the basis of the external system information 450B and perform adjustment such that the subject vehicle M is decelerated or is not accelerated from the current speed.

Modified Example

[Acquisition of Running Information Through Inter-Vehicle Communication]

In the embodiment described above, the information acquiring unit 160 has been described to acquire the ease of merging information 450C from the merging support device 400, the acquisition is not limited thereto. A result of running at the time of merging may be acquired from a vehicle running ahead through inter-vehicle communication, and determination of merging/no-merging may be performed on the basis of the acquired result of running.

Figure 11:
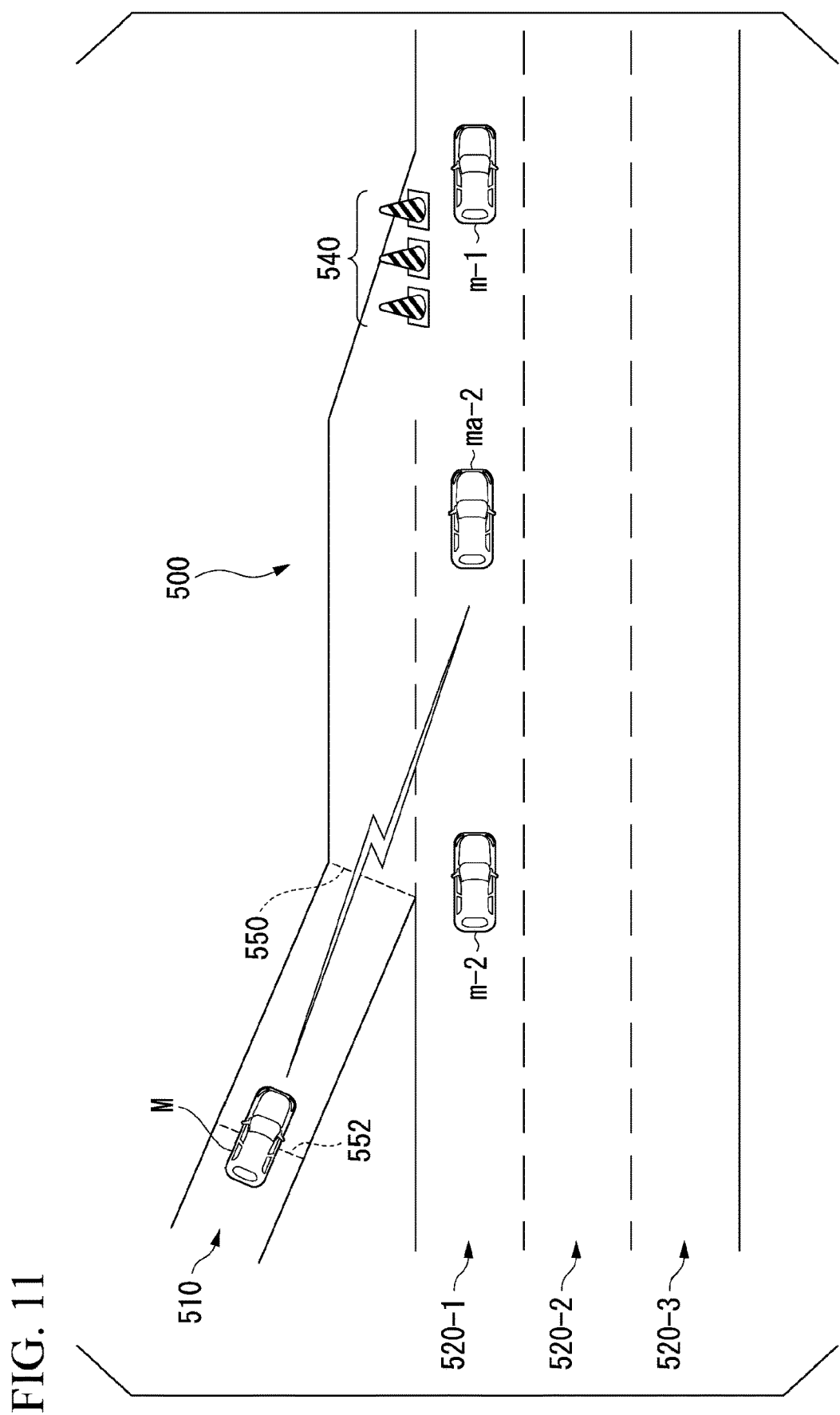
FIG. 11 is a diagram illustrating an example of acquisition of a result of running at the time of merging from a vehicle running ahead through inter-vehicle communication.

FIG. 11 is a diagram illustrating an example of acquisition of a result of running at the time of merging from a vehicle running ahead through inter-vehicle communication. In the example illustrated in FIG. 11, it is assumed that a subject vehicle M can communicate with a vehicle ma-2 running ahead.

The information acquiring unit 160 acquires a running result that is transmitted by the vehicle ma-2 running ahead after merging. In addition, in a case in which inter-vehicle communication with a plurality of other vehicles that have advanced to a main lane 520 from the merging lane 510 before the subject vehicle M can be performed, the information acquiring unit 160 may receive a running result from other vehicle that is closest to the merging point among the plurality of other vehicles. Furthermore, the information acquiring unit 160 may acquire running results from the plurality of other vehicles described above and acquire an average or the like of the acquired running results.

In a case in which inter-vehicle communication as in the example illustrated in FIG. 11 is performed, the information acquiring unit 160 of the subject vehicle M has a function similar to the function of the merging easiness deriving unit 430 of the merging support device 400 described above. In this case, the information acquiring unit 160 derives a degree of ease of merging on the basis of running results acquired from other vehicles. The merging/no-merging determining unit 123A determines merging/no-merging of the subject vehicle M on the basis of the degree of ease of merging derived by the information acquiring unit 160. In addition, the action plan generating unit 123 executes driving control of the subject vehicle M on the basis of a result of determination of merging/no-merging acquired by the merging/no-merging determining unit 123A.

In addition, the subject vehicle M may perform communication through a relay device without performing directly communication between vehicles. In such a case, the relay device, for example, may be installed near a merging point.

In addition, in the embodiment described above, in a case in which it is determined that merging at a target speed set in advance is not be able to be performed on the basis of a degree of ease of merging, although control of decelerating the speed of the subject vehicle M from the target speed and the like, the control is not limited thereto. For example, the action plan generating unit 123 may set a speed at the time of merging transmitted from the vehicle running ahead as a target speed of the subject vehicle M and perform speed control of the subject vehicle M. In addition, in a case in which there is no vehicle running ahead that has merged most recently, the action plan generating unit 123 may set an average speed for lanes to be merged as a target speed of the subject vehicle M and perform speed control of the subject vehicle M. Such speed control may be combined with a part or the whole of the speed control based on the degree of ease of merging described above.

According to the vehicle control system, the vehicle control method, and the vehicle control program according to an embodiment described above, the subject vehicle M can appropriately perform merging through automated driving in accordance with a situation at the time of merging.

More specifically, according to an embodiment, the subject vehicle M can smoothly perform merging while adjusting the speed at the time of merging on the basis of an index value relating to a degree of easiness of merging acquired in advance. In addition, according to an embodiment, by using information of other vehicles, which have advanced from a merging lane to a main lane earlier, at the time of merging, the subject vehicle M can execute appropriate merging according to current situations of lanes. Furthermore, according to an embodiment, the subject vehicle M can perform control of decelerating the subject vehicle such that it merges into a main lane after allowing a vehicle group running in a main lane to pass on the basis of external system information of other vehicles that have previously advanced from a merging lane to a main lane. In addition, according to an embodiment, the subject vehicle M performs switching to manual driving in accordance with an index value relating to easiness of merging and thus can perform appropriate driving control even in a case in which the merging lane, the main lane, and the like are congested.

As above, although a form of the present invention has been described using an embodiment, the present invention is not limited to such an embodiment at all, and various modifications and substitutions can be applied within a range not departing from the concept of the present invention.

REFERENCE SIGNS LIST

1 Vehicle system
10 Camera
12 Radar device
14 Finder
16 Object recognizing device
20 Communication device 30 HMI
50 Navigation device
60 MPU
70 Vehicle sensor
80 Driving operator
90 Vehicle indoor camera
100 Automated driving control unit
120 First control unit
121 External system recognizing unit
122 Subject vehicle position recognizing unit
123 Action plan generating unit
123A Merging/no-merging determining unit
140 Second control unit
141 Running control unit
150 Interface control unit
160 Information acquiring unit
170 Merging result providing unit
180, 450 Storage unit
200 Running driving force output device
210 Brake device
220 Steering device
300 Traffic information sharing system
400 Merging support device
402 Antenna
410 Communication unit
420 Merging result acquiring unit
430 Merging easiness deriving unit
440 Distribution unit
M Subject vehicle

What is claim is:

1. A vehicle control system comprising:
a processor that executes instructions to:
acquire an index value relating to easiness of merging of a subject vehicle and an ease of merging of an other vehicle which is evaluated based on at least one of vehicle information relating to an operation of the other vehicle that has advanced from a merging lane to a main lane before the subject vehicle and external system information acquired near a merging point using the other vehicle in a case in which the subject vehicle is running in the merging lane merging into the main lane; and
execute automated driving of the subject vehicle based on the index value,
wherein, in a case in which there is no other vehicle that has advanced from the merging lane to the main lane within a predetermined time, the processor acquires the index value relating to the easiness of merging based on at least one of the vehicle information relating to the operation of the other vehicle having the same date, time frame, or day of week of merging and the external system information acquired near the merging point using the other vehicle.

2. The vehicle control system according to claim 1, wherein the processor adjusts a speed of the subject vehicle at the time of merging based on the index value relating to the easiness of merging.

3. The vehicle control system according to claim 2, wherein the processor performs control of decelerating a speed of the subject vehicle from a target speed at the time of merging or not accelerating the speed from a speed of a current time point.

4. The vehicle control system according to claim 1, wherein the vehicle information includes at least one of a speed of another vehicle, which has advanced from the merging lane to the main lane before the subject vehicle, after merging, and an acceleration in the merging lane, and a lighting state of a direction indicator of the other vehicle.

5. The vehicle control system according to claim 1, wherein the external system information includes at least one of ground object information acquired near a merging point by another vehicle that has advanced from the merging lane to the main lane before the subject vehicle and information relating to a position of a surrounding vehicle seen from the other vehicle.

6. The vehicle control system according to claim 1, wherein the processor further executes instructions to: determine whether the subject vehicle is able to merge into the main lane on the basis of the index value relating to the easiness of merging,
wherein, in a case in which it is determined that merging is not able to be performed, the processor changes at least one of a position at which merging into the main lane starts and an acceleration of the subject vehicle in the merging lane from a reference value and executes automated driving.

7. The vehicle control system according to claim 6, wherein, in a case in which it is determined that merging is not able to be performed, the the processor executes control of switching the subject vehicle from automated driving to manual driving.

8. The vehicle control system according to claim 1, wherein, in a case in which there is the other vehicle that has advanced from the merging lane to the main lane before the subject vehicle within the predetermined time, the processor acquires at least one of vehicle information relating to the operation of the other vehicle and the external system information acquired near the merging point by the other vehicle and generates an index value relating to the easiness of merging into the main lane.

9. A vehicle control method using an in-vehicle computer, the vehicle control method comprising:
acquiring as an index value relating to easiness of merging of a subject vehicle and an ease of merging of an other vehicle which is evaluated based on at least one of vehicle information relating to an operation of the other vehicle that has advanced from a merging lane to a main lane before the subject vehicle and external system information acquired near a merging point using the other vehicle in a case in which the subject vehicle is running in the merging lane merging into the main lane;
executing automated driving of the subject vehicle on the basis of the acquired index value; and
wherein, in a case in which there is no other vehicle that has advanced from the merging lane to the main lane within a predetermined time, acquiring the index value relating to the easiness of merging based on at least one of the vehicle information relating to the operation of the other vehicle having the same date, time frame, or day of week of merging and the external system information acquired near the merging point using the other vehicle.

10. A non-transitory computer-readable storage medium that stores an in-vehicle control program to be executed by an in-vehicle computer to perform at least:
acquire as an index value relating to easiness of merging of a subject vehicle and an ease of merging of an other vehicle which is evaluated based on at least one of vehicle information relating to an operation of the other vehicle that has advanced from a merging lane to a main lane before the subject vehicle and external system information acquired near a merging point using the other vehicle in a case in which the subject vehicle is running in the merging lane merging into the main lane;
execute automated driving of the subject vehicle on the basis of the acquired index value, and
wherein, in a case in which there is no other vehicle that has advanced from the merging lane to the main lane within a predetermined time, acquire the index value relating to the easiness of merging based on at least one of the vehicle information relating to the operation of the other vehicle having the same date, time frame, or day of week of merging and the external system information acquired near the merging point using the other vehicle.

* * * * *